A. BARR & W. STROUD.
SEXTANT.
APPLICATION FILED DEC. 27, 1913.
1,098,212.
Patented May 26, 1914.
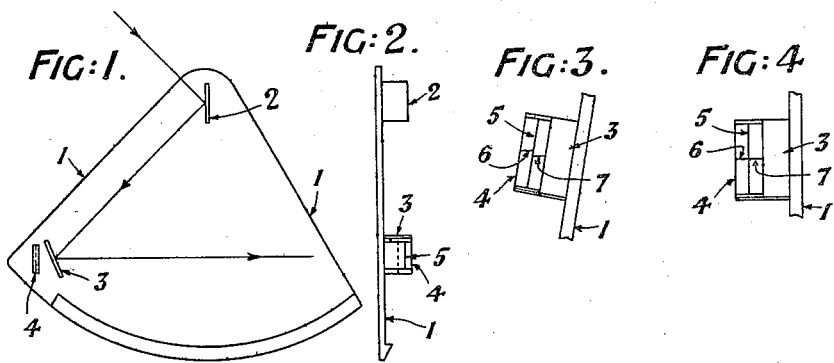
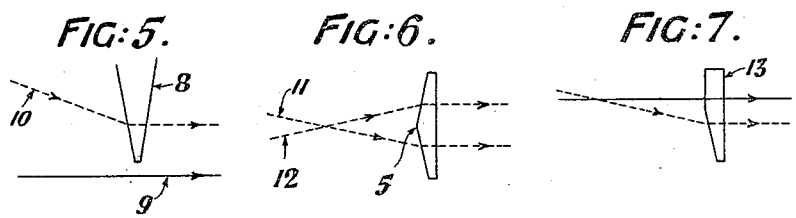
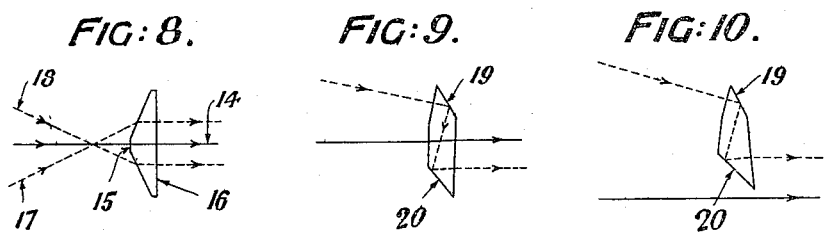
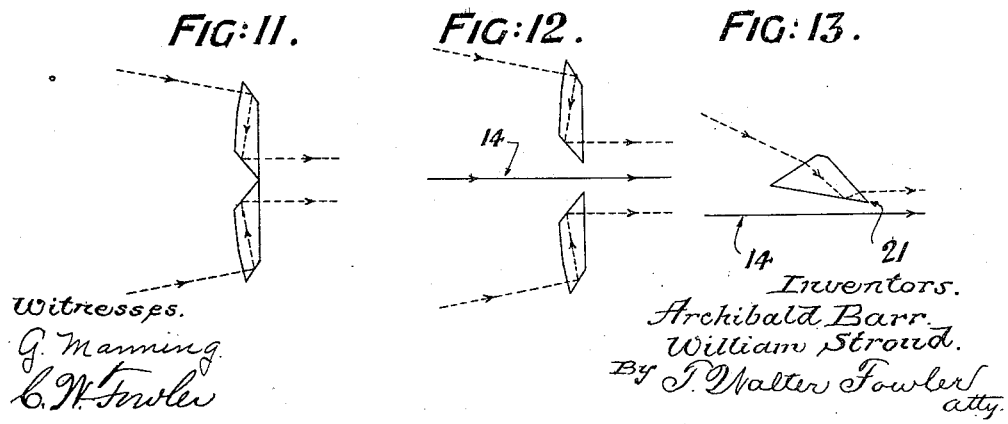
Witnesses.
G. Manning
C. W. Fowler
Inventors.
Archibald Barr
William Stroud
By T. Walter Fowler
atty.

UNITED STATES PATENT OFFICE.

ARCHIBALD BARR AND WILLIAM STROUD, OF ANNIESLAND, GLASGOW, SCOTLAND.

SEXTANT.

1,098,212.  Specification of Letters Patent. Patented May 26, 1914.

Application filed December 27, 1913. Serial No. 808,979.

*To all whom it may concern:*

Be it known that we, ARCHIBALD BARR and WILLIAM STROUD, subjects of the King of Great Britain and Ireland, and both of Caxton street, Anniesland, Glasgow, Scotland, have invented new and useful Improvements in Sextants, of which the following is a specification.

The object of our invention is to provide improved means for enabling the plane of triangulation of a sextant to be readily set vertically. This we accomplish by providing an optical device, associated with the means for directly viewing the horizon, so as to enable the observer to obtain in close proximity two (or more) views of the horizon in two (or more) different azimuths.

A very simple device for the purpose in view consists in the provision of a refracting prism whose edge has been adjusted once for all parallel to the plane of triangulation of the sextant. This edge is so placed that it intersects the field of view, so that the observer can see a part of the horizon directly and at the same time another part of the horizon through the prism. If this edge be vertical the two parts of the horizon will appear in coincidence, whereas if the edge be inclined to the vertical, the two parts will no longer be in coincidence, but by altering the position of the plane of triangulation until the two parts are in coincidence, we secure that this plane shall be vertical.

The essential feature of the device therefore consists in the provision of means for observing in proximity parts of the horizon in different azimuths, *e. g.*, in the case mentioned, if the refracting angle of the prism is 10°, the observer will obtain a direct view of the horizon in proximity to a view of the horizon 10° to the right or left, depending upon the way the refraction occurs.

Instead of obtaining one direct and one refracted view of the horizon, we may employ a biprism to obtain two refracted views, one, say 10° to the right, and the other 10° to the left. If desired we may obtain three views, one direct, a second by refraction in one sense, and a third by refraction in the opposite sense, thus, *e. g.*, by polishing away the edge of a biprism so as to produce a flat surface parallel to the base.

Instead of employing devices depending upon refraction for obtaining the second view of the horizon we may employ devices depending upon reflection, thus, *e. g.*, we may replace a refracting prism of 10° by a doubly reflecting prism in which the two reflecting faces are inclined to one another at an angle of 5°. In this case the line of intersection of the two reflecting faces corresponds to the edge of the refracting prism and this line must be set parallel to the plane of triangulation of the sextant.

In certain cases we may employ a single reflecting surface to replace the doubly reflecting prism, but this arrangement, when the plane of triangulation is no longer vertical, produces a rotation of the indirect view instead of a simple translation of the view up or down.

Some examples of devices according to this invention will now be described with reference to the accompanying drawing, in which:—

Figure 1 is a diagrammatic view of an ordinary sextant and Fig. 2 a sectional elevation with one form of the optical device attached. Fig. 3 shows the appearance presented to the eye by the horizon when the plane of the sextant is not held vertically and Fig. 4 the appearance when it is correctly held. Figs. 5, 7, 9, 10 and 12, represent various alternative methods of obtaining a lateral view of the horizon simultaneously with the direct view. Figs. 6, 8 and 11, represent various alternative methods of obtaining two lateral views of the horizon simultaneously, one on the right hand side and one on the left. Fig. 13 shows a similar device in which a singly reflecting system is employed. All the Figs. 5 to 13 show plans of the various devices.

In Figs. 1 and 2, 1 is the sextant frame, 2 the index glass and 3 the horizon glass; 4 is the special attachment for accomplishing the purpose of the invention, which, in the case shown, is supposed to be a biprism operating after the manner of Fig. 6. The edge 5 of this biprism, Fig. 2, is once for all adjusted by any suitable means so that it is parallel to the plane of the sextant frame 1,

*i. e.*, so that the edge is in a vertical plane when the sextant is correctly held.

Fig. 3 is a view of the horizon glass 3 and biprism 4 with edge 5 as seen by the eye when the sextant is incorrectly held. It will be seen that the two views of the horizon 6 and 7 are not in coincidence, whereas upon turning the frame of the sextant about the line of sight as axis until the two images of the horizon 6 and 7 are in coincidence, Fig. 4, the sextant is placed in the correct position.

In Fig. 5 the device takes the form of a simple refracting prism 8. The direct view is indicated by 9 and the lateral view by 10.

In Fig. 6 there are two refracting prisms, forming what is commonly known as a biprism. It will be seen that the left hand part of the field comes from the horizon on the right hand side 11, and vice versa, as shown by the line 12.

Fig. 7 corresponds closely to the case of Fig. 6, except that all the refraction is confined to one prism. A direct view of the horizon is in this case seen through the parallel glass 13 of the prism.

Fig. 8 shows a method of obtaining a triple view of the horizon, the central part is seen by rays 14 coming directly through the flat 15 parallel to the base 16 of the prism. The left hand beam is formed by rays 18 coming from the right hand side of the horizon and the right hand beam by rays 17 coming from the left of the horizon.

Figs. 9 and 10 show methods of obtaining one lateral view by reflection instead of refraction, together with a direct view. In Fig. 9 the direct view is obtained through the parallel glass and the lateral view by double reflection from the two reflecting faces 19 and 20 which are not parallel to one another. It is not essential that the glass should be rigidly parallel for the direct view; if the glass is prismatic instead of parallel the view will no longer be quite direct. Fig. 10 corresponds to the case of Fig. 9 except that the direct view is not through glass at all.

Figs. 11 and 12 show two methods of obtaining two lateral views each by double reflection. In Fig. 11 the prism of Fig. 9 is duplicated so as to furnish the two lateral views and in Fig. 12 the two prisms of Fig. 9 are separated slightly so as to give a direct view 14 as well, thus furnishing a triple field.

Fig. 13 shows a method of obtaining a lateral field by a single reflection. In this case the separating line between the two fields may conveniently be the edge 21. The reflecting face of this prism must be inclined to the plane of the sextant, as shown in plan in Fig. 13, where we may suppose the plane of the sextant to be parallel to the line 14. In this case, however, a rotation of the sextant frame from the vertical, as in Fig. 3, will be accompanied by a rotation as well as a translation of the lateral view of the horizon, *i. e.*, the line 7 (say) will no longer be horizontal.

Figs. 5 to 13 show only a few of the possible arrangements whereby one or more lateral views of the horizon can be produced.

It will be clear that we may arrange to produce one lateral view by double reflection, say, after the manner of Fig. 10, and a second lateral view by refraction, say, after the manner of Fig. 5, and we may arrange that these two views are seen, if desired, in optical juxtaposition with the direct view. In fact, the invention may be modified in a large variety of ways, the essential feature being the provision of means for bringing into optical juxtaposition two (or more) parts of the horizon.

We claim:

1. A sextant in combination with means for observing in close proximity views of parts of the horizon in different azimuths, for the purpose set forth.

2. A sextant in combination with means for observing in close proximity two views of parts of the horizon in different azimuths, for the purpose set forth.

3. A sextant in combination with means for observing in close proximity views of parts of the horizon in different azimuths, one view being in the direction of the line of sight of the observer, for the purpose set forth.

4. A sextant in combination with means for observing in close proximity two views of parts of the horizon in different azimuths, one part of which is in the direction of the line of sight of the observer.

5. A sextant in combination with means for observing in close proximity views of parts of the horizon in different azimuths, one view being a direct view of a part of the horizon, for the purpose set forth.

6. A sextant in combination with means for observing in close proximity two views of parts of the horizon in different azimuths, one view being a direct view of a part of the horizon, for the purpose set forth.

7. A sextant in combination with a refracting prism for obtaining a view of a part of the horizon outwith the direction of the line of sight of the observer and produced in close proximity to a view of a part of the horizon in a different azimuth to the aforesaid part, for the purpose set forth.

8. A sextant in combination with a refracting prism for obtaining in close proximity views of parts of the horizon in different azimuths, for the purpose set forth.

9. A sextant in combination with a refracting prism for obtaining in close proximity two views of parts of the horizon in different azimuths, for the purpose set forth.

10. A sextant in combination with a refracting prism for obtaining in close proximity views of parts of the horizon in different azimuths, one of which is in the direction of the line of sight of the observer, for the purpose set forth.

11. A sextant in combination with a refracting prism having its edge adjusted parallel to the plane of triangulation of the sextant, the edge intersecting the field of view, for the purpose set forth.

ARCHIBALD BARR.
WILLIAM STROUD.

Witnesses:
 ARLINE DOWIES,
 ROBINA McEWING.

Copies of this patent may be obtained for five cents each, by addressing the "Commissioner of Patents, Washington, D. C."